United States Patent [19]

Bailey

[11] 3,927,008

[45] Dec. 16, 1975

[54] 5-(3-PYRIDYL)-2-FUROIC ACID

[76] Inventor: Denis M. Bailey, East Greenbush, N.Y.

[22] Filed: Oct. 29, 1974

[21] Appl. No.: 518,856

Related U.S. Application Data

[62] Division of Ser. No. 392,936, Aug. 30, 1973, Pat. No. 3,890,335.

[52] U.S. Cl. ........ 260/295.5 R; 260/297 R; 424/263
[51] Int. Cl.$^2$ .................................... C07D 213/55
[58] Field of Search ............................. 260/295.5 R

[56] References Cited
OTHER PUBLICATIONS

Chemical Abstracts, Volume 77(23), 151, 178h, Dec. 4, 1972.

Dunlop et al., The Furans, Reinhold Pub. Co., pp. 488–489, (1953).

*Primary Examiner*—Alan L. Rotman
*Attorney, Agent, or Firm*—Robert K. Bair; B. Woodrow Wyatt

[57] ABSTRACT

5-(3-Pyridyl)-2-furaldehyde (I) and 5-(3-pyridyl)-2-furoic acid (II), having hypolipidemic activity, are prepared by reacting a 3-pyridyl diazonium salt with furfural to produce I and reacting I with an oxidizing agent capable of converting carboxaldehydes to carboxylic acids to produce II.

1 Claim, No Drawings

5-(3-PYRIDYL)-2-FUROIC ACID

This application is a division of copending application Ser. No. 392,936, filed Aug. 30, 1973, and now U.S. Pat. No. 3,890,335 issued June 17, 1975.

This invention relate to 2-furaldehyde derivatives and to processes for their preparation.

The invention in its composition aspect resides in 5-(3-pyridyl)-2-furaldehyde of the formula I

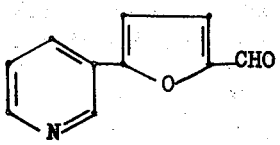

and 5(3-pyridyl)-2-furoic acid of the formula II

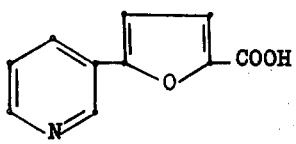

Also encompassed by the invention are the pharmacologically acceptable salts of the 5-(3-pyridyl)-2-furoic acid of formula II.

Biological evaluation of the compounds of the invention has shown that they possess hypolipidemic activity and are therefore useful in treating atherosclerotic conditions brought about by elevated serum levels of lipids, for example, non-esterified fatty acids.

Preferred pharmacologically acceptable salts of 5-(3-pyridyl)-2-furoic acid include the sodium, calcium, magnesium and ammonium salts, and salts of organic amines of low toxicity, for example, the diethanolamine and N-methylglucamine salts.

The invention in a process aspect resides in the process of reacting a 3-pyridyl diazonium salt, preferably the chloride, with furfural in the presence of a suitable catalyst, preferably cupric chloride, to form 5-(3-pyridyl)-2-furaldehyde of formula I. The intermediates used in this process aspect are known compounds or are readily prepared from known compounds.

The invention in another process aspect resides in the process of reacting 5-(3-pyridyl)-2-furaldehyde with an oxidizing agent capable of converting carboxaldehydes to carboxylic acids to form 5-(3-pyridyl)-2-furoic acid of formula II.

The molecular structures of the composition aspects of the invention were established by their modes of synthesis and confirmed by the correspondence of calculated and found values for the elementary analyses and by infrared and nuclear magnetic resonance spectral analyses.

The manner and process of making and using the instant invention will now be generally described so as to enable a person skilled in the art of pharmaceutical chemistry to make and use the same as follows.

The reaction which comprises reacting a 3-pyridyl diazonium salt with furfural to form 5-(3-pyridyl)-2-furaldehyde (I) is carried out by slow addition, preferably dropwise, of a cold solution of the 3-pyridyl diazonium salt (preferably prepared by dropwise addition of an aqueous solution of sodium nitrite to 3-aminopyridine in a strong mineral acid at −10° to −15°C.) with stirring to the 2-furaldehyde, preferably in aqueous acetic acid solution, in the presence of the catalyst, preferably cupric chloride, keeping the reaction temperature preferably in the approximate range of 20°–30°C. Concentrated hydrochloric acid was preferably used as the strong mineral acid, thereby resulting in the formation of 3-pyridyl diazonium chloride as the preferred diazonium salt. Instead of concentrated hydrochloric acid, aqueous hydrochloric acid as low as 3N in strength can be used as well as other strong mineral acids, e.g., aqueous sulfuric acid. Other catalysts which can be used in place of cupric chloride are cuprous and cupric salts of strong mineral acids, e.g., cuprous chloride, cupric sulfate, and the like.

The reaction of 5-(3-pyridyl)-2-furaldehyde (I) to produce 5-(3-pyridyl)-2-furoic acid (II) is generally carried out by reacting I with an oxidizing agent capable of oxidizing carboxaldehydes to carboxylic acids. Such oxidizing agents are, for example, silver oxide in an aqueous alkaline medium; an alkali permanganate, e.g., $KMnO_4$, in a basic or acidic medium; an alkali dichromate, e.g. $Na_2Cr_2O_7$, or chromic anhydride ($CrO_3$) under acidic conditions, preferably using sulfuric acid. The reaction conditions vary and are dependent upon the particular oxidizing agent used. For example, oxidation with silver oxide is carried out in an alkaline aqueous ethanol solution, preferably using an alkali, e.g., sodium hydroxide, preferably keeping the reaction temperature below 35°C.; oxidation with potassium permanganate is conveniently run at lower temperature, preferably below 20°C., in a basic medium, preferably in pyridine which also acts as a solvent or in aqueous sodium or potassium hydroxide or in aqueous sulfuric acid.

The best mode contemplated for carrying out the invention is now set forth as follows:

EXAMPLE 1

5-(3-Pyridyl)-2-furaldehyde

To a stirred solution containing 20 g. of 3-aminopyridine in 300 ml. of concentrated hydrochloric acid cooled to and kept at −10° to −15°C. was added dropwise a solution of 18 g. of sodium nitrite in 164 ml. of water. The cold solution containing 3-pyridyl diazonium chloride was added dropwise with stirring to a mixture containing 50 g. of furfural, 6 g. of cupric chloride dihydrate, 50 ml. of glacial acetic acid and 100 ml. of water over a thirty minute period while keeping the reaction temperature between 23° and 28°C. the addition of a gram or so of 100 mesh ground glass greatly accelerated the liberation of the nitrogen. The reaction mixture was stirred for an additional thirty minutes and then extracted three times with chloroform and once with ether. To the aqueous mixture was added ice followed by 35% aqueous sodium hydroxide solution to a pH of about 9–10. The resulting crystalline brown precipitate was collected and dissolved in chloroform. The alkaline filtrate also was extracted with chloroform. The combined chloroform solutions were dried over anhydrous potassium carbonate, treated with decolorizing charcoal and filtered. The filtrate was evaporated to leave 16.9 g. of solid which was re-precipitated from 80 ml. of isopropyl acetate and dried at 50°C. to yield, as a light tan powder, 7.4 g. of 5-(3-pyridyl)-2-furaldehyde, m.p. 104°–106°C. A second crop of 7 g. of this aldehyde was obtained by evaporating off the ispropyl acetate from the filtrate and triturating the remaining residue with a mixture of isopropyl acetate and n-hexane. This second crop of 5-(3-pyridyl)-2-furaldehyde was used in Example 2 to prepare the corresponding 2-furoic acid.

EXAMPLE 2

5-(3-Pyridyl)-2-furoic Acid.

A stirred mixture containing 7 g. of 5-(3-pyridyl)-2-furaldehyde, 20 g. of silver oxide, 50 ml. of water, 50 ml. of ethanol and 20 ml. of 10% aqueous sodium hydroxide solution was kept below 35°C. with slight external cooling for one hour and then filtered. The filtrate was concentrated in vacuo below 40°C. to about one-half its volume and then acidified with glacial acetic acid to a pH of about 6. There resulted a heavy precipitate which was so fine that it could not effectively be filtered. The mixture was diluted with 200 ml. of saturated brine and the resulting mixture was extracted with large volumes of ethyl acetate. The extract was dried over anhydrous sodium suflate and the solvent distilled off in vacuo. The remaining residue was crystallized from isopropyl alcohol and air-dried to yield 2.1 g. of 5-(3-pyridyl)-2-furoic acid, m.p. 270°C. with decomposition.

The hypolipidemic activity of the compounds of the invention was measured by oral administration. Serum nonesterified fatty acids were determined in overnight-fasted Sprague-Dawley strain rats one hour post-medication following the method of Duncombe [Biochem. J. 88, 7 (1963)] based on the colorimetric estimation of a copper-serum non-esterified fatty acid complex. Seven rats per dose level were medicated via stomach tube. Each rat received the compound being tested in 10 ml. per kilo of body weight of 1% aqueous gum tragacanth solution. Each of eight control rats received only the gum tragacanth solution. Serum samples were analyzed for nonesterified fatty acid (NEFA) and were reported as the number of microequivalents ($\mu$Eq.) per liter ± standard error. The hypolipidemic activities of the compounds are evaluated in terms of the percentage reduction of serum NEFA at a given dose level compared with the controls. For example, at an oral dose of 50 mg./kg. of 5-(3-pyridyl)-2-furaldehyde, serum NEFA was reduced from 538 ± 66 $\mu$Eq. per liter (for the controls) to 349 ± 22 $\mu$Eq. per liter or a 35% reduction and at the same dose level 5-(3-pyridyl)-2-furoic acid was found to reduce serum NEFA from 522 ± 43 $\mu$Eq. per liter to 385 ± 32 $\mu$Eq. per liter or a 26% reduction.

The actual determination of the numerical hypolipidemic data definitive for a particular compound of the invention is readily obtained by known standard test procedures by technicians versed in hypolipidemic test procedures, without any need for any extensive experimentation.

The compounds of the invention can be prepared for use by conventional pharmaceutical procedures: that is, by dissolving or suspending them in a pharmaceutically acceptable vehicle, e.g., aqueous alcohol, glycol, oil solution, or oilwater emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

I claim:
1. 5-(3-Pyridyl)-2-furoic acid.

* * * * *